United States Patent [19]
Gore, Jr.

[11] Patent Number: 5,794,237
[45] Date of Patent: Aug. 11, 1998

[54] SYSTEM AND METHOD FOR IMPROVING PROBLEM SOURCE IDENTIFICATION IN COMPUTER SYSTEMS EMPLOYING RELEVANCE FEEDBACK AND STATISTICAL SOURCE RANKING

[75] Inventor: Robert Cecil Gore, Jr., Pflugerville, Tex.

[73] Assignee: International Business Machines Corporation, Armonk, N.Y.

[21] Appl. No.: 963,092

[22] Filed: Nov. 3, 1997

Related U.S. Application Data

[63] Continuation of Ser. No. 555,951, Nov. 13, 1995, abandoned.

[51] Int. Cl.[6] .................................................. G06F 17/30
[52] U.S. Cl. ...................... 707/5; 707/3; 707/7; 707/529; 704/7
[58] Field of Search .......................... 707/3, 5, 7, 529; 704/7

[56] References Cited

U.S. PATENT DOCUMENTS

| | | | |
|---|---|---|---|
| 5,117,353 | 5/1992 | Stipanovich et al. | 374/401 |
| 5,182,793 | 1/1993 | Alexander et al. | 395/13 |
| 5,195,029 | 3/1993 | Murai et al. | 364/184 |
| 5,224,206 | 6/1993 | Simoudis | 395/51 |
| 5,241,671 | 8/1993 | Reed et al. | 395/600 |
| 5,243,689 | 9/1993 | Yoshiura et al. | 395/77 |
| 5,293,552 | 3/1994 | Aalbersberg | 364/419.19 |
| 5,319,739 | 6/1994 | Yoshiura et al. | 395/51 |
| 5,404,518 | 4/1995 | Gilbertson et al. | 707/3 |
| 5,418,951 | 5/1995 | Damashek | 395/600 |
| 5,444,823 | 8/1995 | Nguyen | 395/51 |
| 5,446,883 | 8/1995 | Kirkbride et al. | 395/600 |
| 5,471,611 | 11/1995 | McGregor | 395/600 |
| 5,499,366 | 3/1996 | Rosenberg et al. | 395/600 |
| 5,537,586 | 7/1996 | Amram et al. | 395/600 |
| 5,544,049 | 8/1996 | Henderson et al. | 364/419.19 |
| 5,544,352 | 8/1996 | Egger | 395/600 |
| 5,576,954 | 11/1996 | Driscoll | 395/603 |
| 5,715,374 | 2/1998 | Heckerman et al. | 707/5 |
| 5,717,835 | 2/1998 | Hellerstein | 707/5 |

*Primary Examiner*—Thomas G. Black
*Assistant Examiner*—Jean R. Homere
*Attorney, Agent, or Firm*—Robert M. Carwell

[57] ABSTRACT

Objects or files are created containing problem source identification information. The database of problem source identification methods is provided to the user through a computer user interface with statistical ranking according to the problem symptom provided by the user. The user provides to the system relevance feedback for the particular problem source identification method, appending the symptom to the method, marking the method for review update and/or deletion. A simple method is provided for searching the solution database once the cause has been identified. Problem source identification methods of the most use and/or most common frequency of occurrence are ranked accordingly, obviating the problem of creating and maintaining cases associated with case-based systems. In addition to the database of problem source identification (PSI) methods for a particular problem domain and a database of solutions to problems in such domains, a search engine order search hits based on statistical ranking. Each PSI method contains hyperlinks into the solution database to create a network of methods and solutions.

27 Claims, 7 Drawing Sheets

SYSTEM AND METHOD FOR IMPROVING PROBLEM SOURCE IDENTIFICATION IN COMPUTER SYSTEMS EMPLOYING RELEVANCE FEEDBACK AND STATISTICAL SOURCE RANKING

This is a continuation of application Ser. No. 08/555,951 filed Nov. 13, 1995, now abandoned.

TECHNICAL FIELD

This invention relates in general to computer processing, and more particularly, to automated systems and methods for assisting in the identification of sources of problems in complex computer systems and the like.

BACKGROUND OF THE INVENTION

One area where application of computer systems is particularly beneficial is in their use as tools to solve problem in diverse disciplines ranging from medical diagnostics to computer system service and support. Given the increasing complexity of such systems in need of problem-solving tools, there is a correspondingly increasing variety and sophistication of such tools being made available.

For example, with the advent of various online systems and services, there has been immense improvement in delivery mechanisms and diagnostics for computer systems themselves. A technician at a remote location may be able to examine a local computer installation from a remote location, diagnose a problem, and even provide bug fixes and the like over a network without the user even having to interact with the problem-solving technician.

Notwithstanding such advances, the immense problem of facilitating better diagnostics and problem solving nevertheless still remains. Extensive development has gone into better utilizing the improved memory capacity and processing capability of modern computers for such diagnostics and problem solving. Accordingly, developments in the field of expert systems and artificial intelligence, for example, have been brought to bear in an effort to provide users of computer systems with simpler and more effective methods of solving problems with the systems.

The fundamental approach to computer-aided problem solving relies upon case or rule-based system design. In the design of such systems, expert knowledge and systems, and various forms of an inference engines are utilized to assist the user in determining the solution to a problem. In essence, such systems attempt to synthesize the expert knowledge and store it in the inference engine. This is a tremendously advantageous and powerful approach provided the expert knowledge is easily obtainable and maintainable and may be readily synthesized into such an inference engine. However, it is precisely for these reasons that these prior art approaches do not necessarily work in all applications, and in particular in situations involving large and constantly changing problem domains.

Representative references disclosing various approaches to inference engines and inference expert systems may be found in U.S. Pat. No. 5,243,689; U.S. Pat. No. 5,195,029; U.S. Pat. No. 5,182,793; and U.S. Pat. No. 5,224,206.

Such case-based systems have several unique characteristics which unfortunately also carry with them several drawbacks. First, case-based systems attempt to "solve" a problem, focusing on this rather than assisting in merely identifying what the problem is. Case-based systems typically imbed the symptom, cause, and solution of problems into their cases, a representative example of which may be found in the aforementioned U.S. Pat. No. 5,224,206, col. 12. This case database approach suffers from several dramatic disadvantages associated with large and constantly changing problem domains.

First, the knowledge necessary to create such a database simply may not exist. For example, new products may have to be encompassed by the system with never-before seen problems, or the problems may relate to the network environment with a correlative huge number of permutations and combinations of causes.

Secondly, creating these cases by gathering the facts and synthesizing them can be an extremely expensive and time consuming proposition—so much so that many projects embarking on problem solution employing this method fail at this point once the system designer appreciates the magnitude of the case creation task itself.

Thirdly, in a rapidly changing problem domain, even if it is acceptable system design to incur the cost of creating the cases, such case information nevertheless is always subject to being incomplete or obsolete and in need of expensive maintenance.

Thus, in summary and by way of background, many types of expert system designs exist for solving problems and have become quite sophisticated. However, as aforesaid they rely on case-based or rule-based engines (although a few neural network systems exist as well). Such expert systems involve extensive knowledge engineering, which is to say they incur significant cost in creating extensive rules or large numbers of cases necessary to address the problem domain. Thus, these systems fail to provide an adequate solution for large problem domains such as for example in commercial software defect support for operating systems. In the latter application, for example, the knowledge base is so extensive and there always appears to be so much more to be learned about the problem domain that creation of an adequate knowledge model appears to be an unattainable goal, although a necessary ingredient for state of the art systems. Such domains are continuously and rapidly changing such that the expert system model approach collapses when confronted with the scope of such knowledge and the large number of permutations of real-life service issues.

SUMMARY OF THE INVENTION

It is therefore one object of the present invention to provide an improved system and method for automated problem source identification in computer systems.

It is another object of the present invention to provide an improved problem source identification system and method having characteristics of expert systems while at the same time avoiding the associated expense.

It is a further object of the invention to provide for an improved problem source identification system and method which obviates the need to store cases and rules and to provide inference engines.

It is still a further object of the invention to provide a system and method for automated problem source identification more readily adaptable to large problem domains.

It is yet another object of the invention to provide an improved system and method for delivering software defect support in a cost effective manner, taking advantage of assumptions of skilled technical users.

In accordance with the teachings of the invention, a system and method is provided which improves problem resolution time and quality by capturing problem source identification methods, storing these methods in a searchable database, and then modifying the retrieval and sorting of these methods employing a relevance feedback mechanism. Results from such problem source identification systems and methods are thereafter utilized advantageously to hyperlink to specific information explaining how to resolve the problem.

In accordance with the invention, the system and method disclosed herein simplifies the creation and administration of providing computer-based problem identification and solution assistance. In a preferred implementation of the model, objects or files are first created containing problem source identification information, such information typically being readily available in commercial enterprises but simply not in a database form. Next, the database of problem source identification methods is provided to the user by means of an appropriate user interface on a computer network with a statistical ranking according to the problem symptom provided by the user. The user with the problem in need of solution then provides to the system relevance feedback for the particular problem source identification method, appending the symptom to the method, marking the method for review, update, deletion, and the like. A simple method is provided to search the solution database once the cause has been identified. The foregoing system and method thereby causes problem source identification methods of the most use and/or most common frequency of occurrence to be ranked accordingly, thereby obviating the problems associated with creating and maintaining cases in case-based systems.

In the preferred embodiment, an assumption of a technically skilled user is made. Such user's whose analytical skills are combined with the storage and statistical capabilities of the computer to provide a powerful but simple approach to solving the problem addressed by the invention. A significant object of the invention is that the fundamental problem is actually separated into two distinct components of problem source identification and problem solution.

In addition to the database of problem source identification (PSI) methods for a particular problem domain and a database of solutions to problems in that domain, the aforesaid search engine preferably may order search hits based on statistical ranking or semantic distance ranking. Each PSI method preferably contains one or more hyperlinks into the solution database in order to create a network of methods and solutions.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying figures wherein:

DETAILED DESCRIPTION OF THE PREFERRED EMBODIMENT

In order to understand application of the invention to computer networks, a description will first be provided of a representative such computer network wherein the invention may be advantageously employed. It will be readily appreciated that the invention admits to applicability to any embodiment of a computer network and thus is not intended to be so limited to the particular illustrative network hereinafter described.

Figure 1:
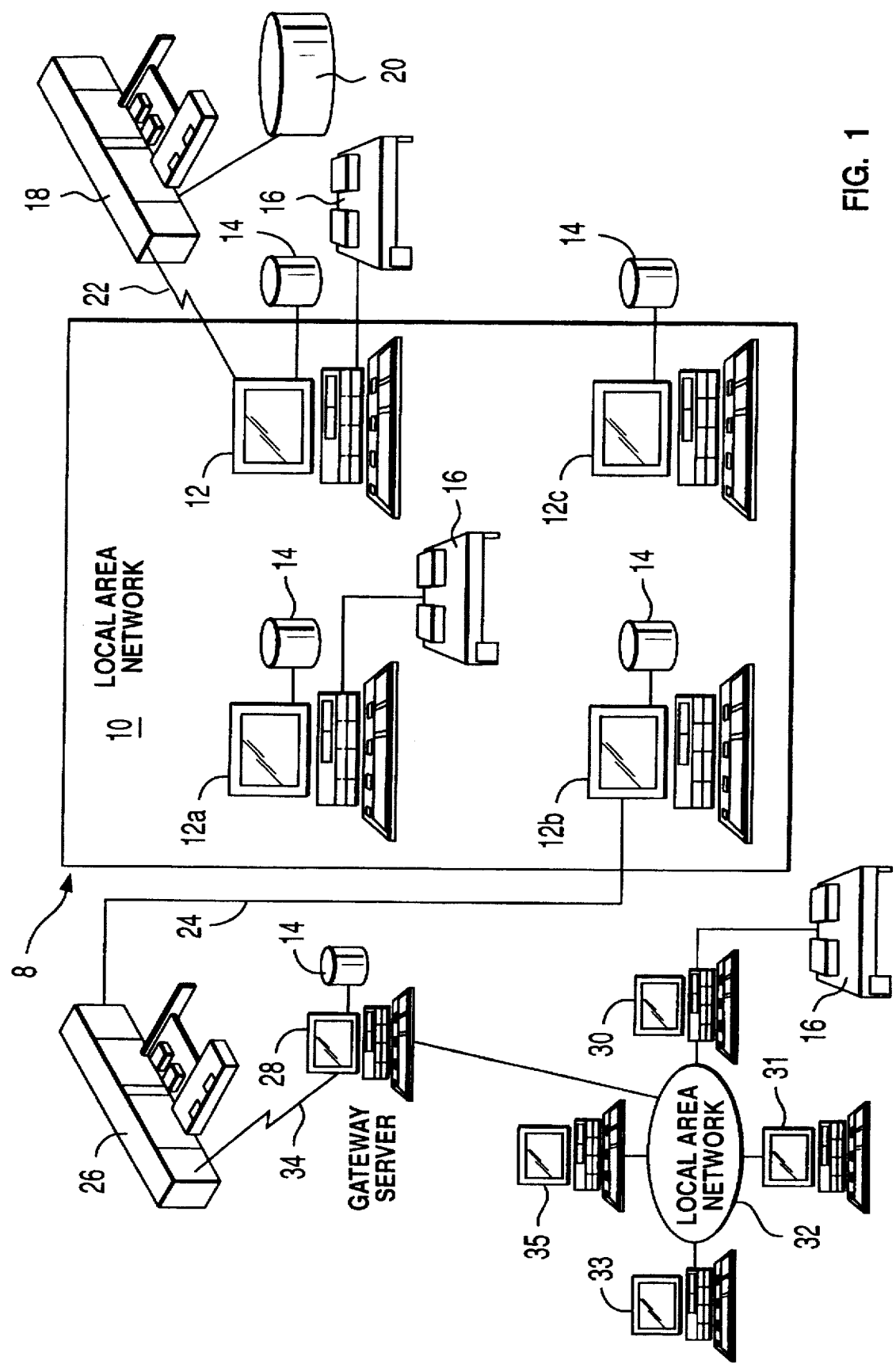
FIG. 1 is a pictorial representation of a computer system including local area networks in which the system and method of the present invention may be advantageously implemented.

With reference now to the figures, and in particular with reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12, 12a–12c, 30, 31, 33 and 35. (Hereafter, when discussing a computer in network 32, a computer 30 will be arbitrarily referenced, although the discussion could relate to any of the computers in network 32). Computers 12 and 30 may be implemented utilizing any suitable computer such as the IBM Personal System/2 (also called a "PS/2") computer or an IBM RISC SYSTEM/6000 computer, both product of International Business Machines corporation, located in Armonk, N.Y. "RISC SYSTEM/6000", is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing an Enterprise Systems Architecture/370 (also called an "ESA/370") or an Enterprise Systems Architecture/390 (also called an "ESA/390") computer available from IBM.

Depending on the application a midrange computer, such as an Application System/400 (also called an "AS/400"), may be employed. "Enterprise Systems Architecture/370", "ESA/370", "Enterprise Systems Architecture/370", and "ESA/390" are trademarks of IBM; "Application System /400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/ communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2A:
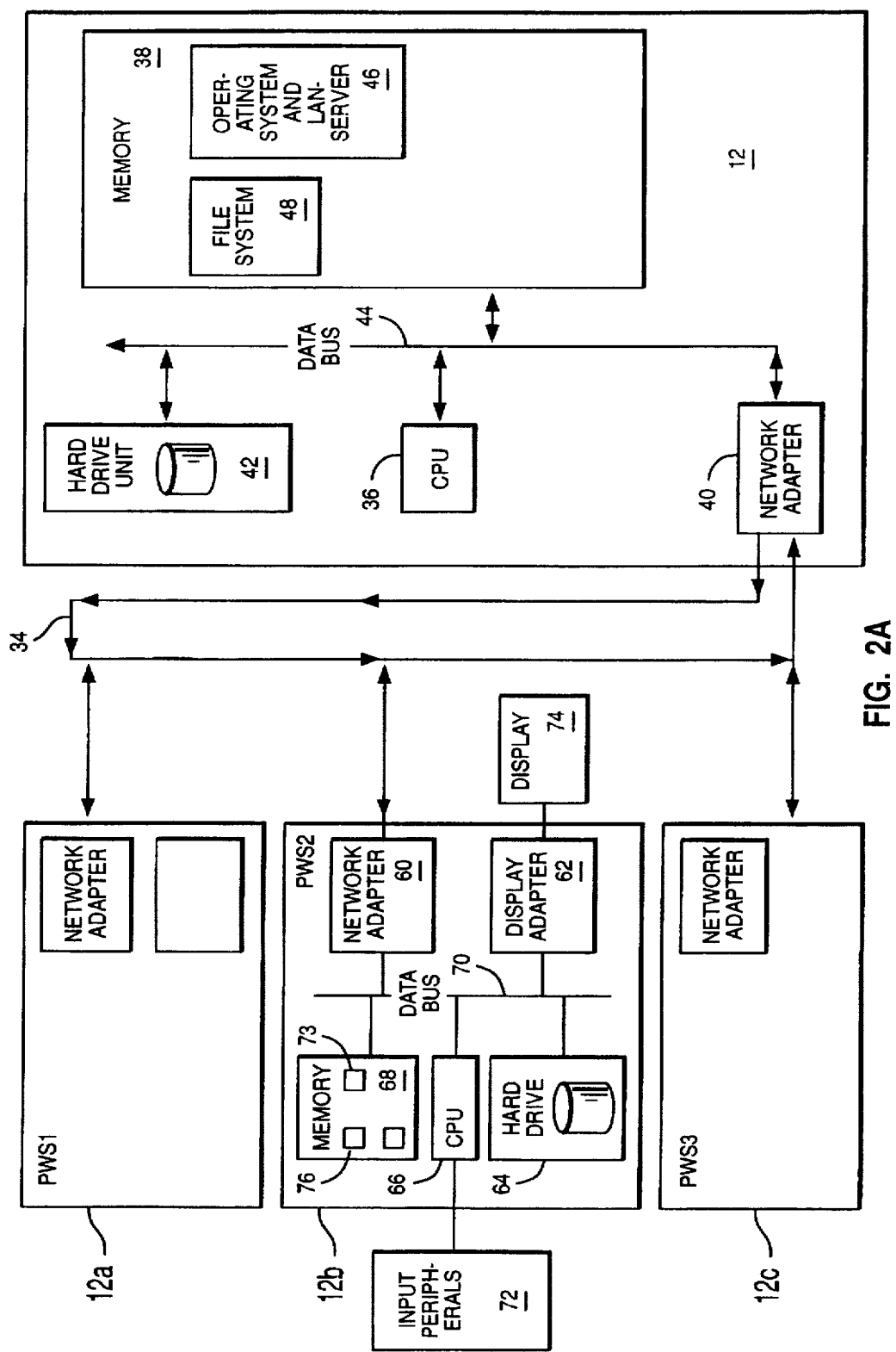
FIGS. 2A and 2B depict block diagram representations of representative ones of the computers shown in FIG. 1 from which the user may provide and obtain problem solution input and output, respectively, in the manner of the invention.

A preferred embodiment of the present invention may be incorporated within various computers depicted within data processing system 8. Referring now to FIG. 2A, a block diagram of LAN 10 is depicted for implementing a method and system of the present invention. Server 12 communicates with computer 12a–12c over communications channel 34. LAN 10 is depicted in a token ring geometry, however, other geometries are possible. Server 12 may be a conventional computer, such as an IBM PS/2 or AS/400 system programmed to practice this invention. Server 12 includes a central processing unit (CPU) 35, a memory 38, and a network adapter 40. Network adapter 40 is utilized for formatting outgoing transmissions and for deformatting incoming transmissions. Server 12 also includes a hard drive unit 42 for storing various objects, such as data files or executable code. Objects may be accessed by one or more users, wherein an object may be transferred to computer memory 38 over data bus 44. A number of objects may exist within memory 38. An operating system and local are network server 46 are represented as one object within memory 38.

Various users may access objects by sending a request to a file system which is conventionally resident on hard drive 42 in server 12 utilizing computers 12a–12c. A "file system" is a collection of files and file management structures that may be located on the physical or logical mass storage device (or even memory 38). Computer 12b is a typical example. Computer 12b operates as a personal work station communicating with server 12. Schematically, computer 12b is substantially similar to server 12, and includes a network adapter 60, a display adapter 62, a hard drive unit 64, a central processing unit (CPU) 66, and addressable memory 68. Components of computer 12b transfer data over data bus 70. CPU 66 directly controls input peripherals 72, which may include a keyboard and a mouse. Display adapter 62 drives display device 74. Memory 68 includes part or all of an operating system 73 which also is conventionally resident in the mass storage device such as hard drive 64. Memory 68 also includes object 76, which was supplied by computer 12 in response to a request to computer 12.

Figure 2B:
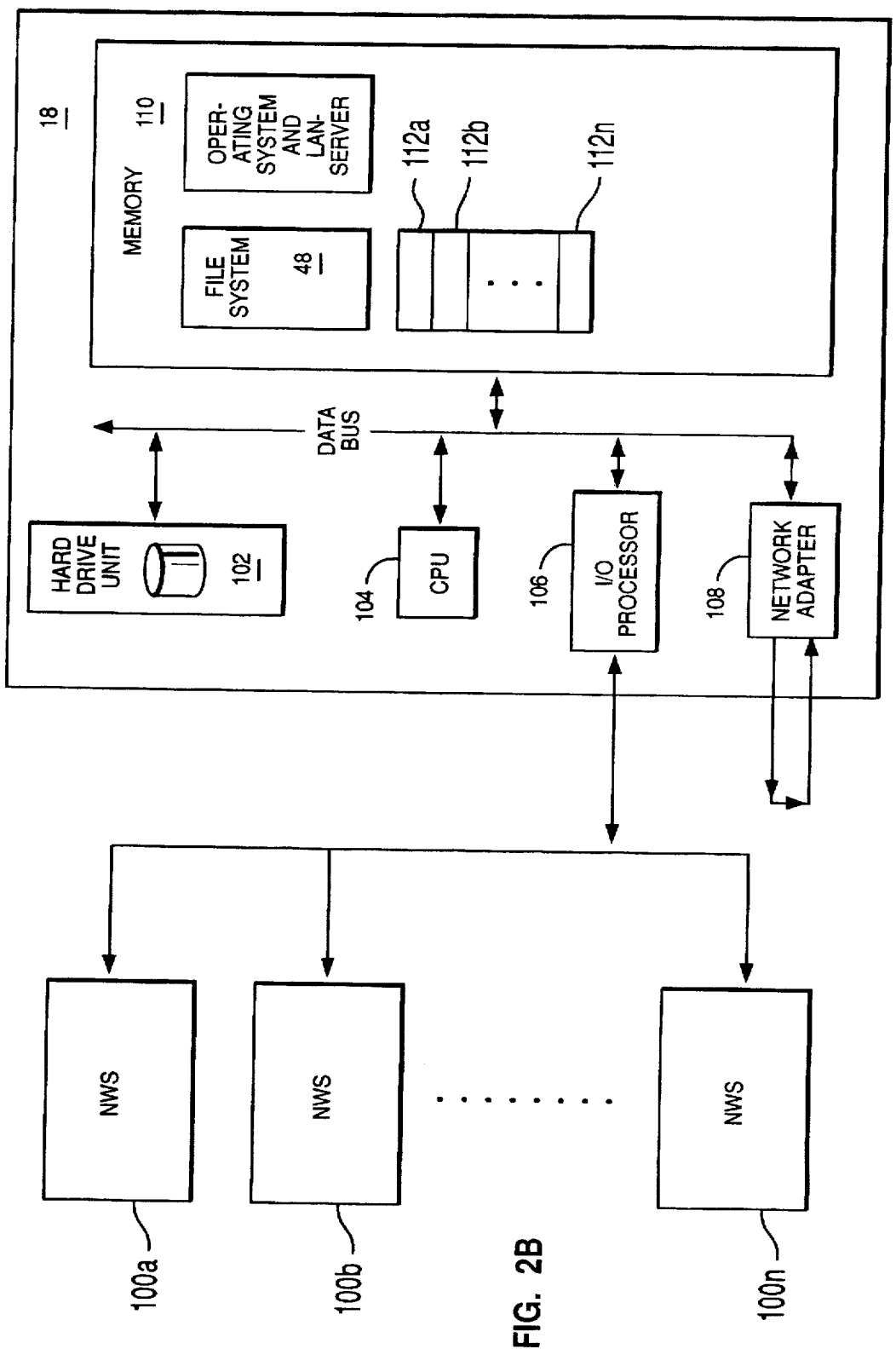

Referring now to FIG. 2B, a block diagram of mainframe computer 18 is depicted in accordance with a preferred embodiment of the present invention. Mainframe computer 18 is a single computer system running multiple processes, such as an IBM ESA/370 or ESA/390 attached to multiple nonprogrammable work stations (NWS) 100a–100n. Mainframe computer 18 includes a hard drive unit 102, CPU 104, input/output (I/O) processor 106 for communicating with nonprogrammable work stations 100a–100n, network adapter 108, and memory 110. Hard drive unit 102 may store objects. Each nonprogrammable work station may access an object within memory 110 or hard drive unit 102. For example, nonprogrammable work station 100a would access object 112a, nonprogrammable work station 100b would access object 112b, and nonprogrammable work station 100n would access object 112n in accordance with a preferred embodiment of the present invention.

First an overall description of the invention will be provided followed by a more detailed description with reference to the figures.

It will be noted that, as described, the invention places emphasis on collecting and maintaining problem source identification methods. However, in distinct contrast to methods of the prior art, these problem source identification methods are not linked to cases and are not built by rules into an expert system, but rather are created by problem domain experts and retrieved by users employing a statistical or semantic distance search algorithm. The ranking of the problem source identification (PSI) methods are "skewed", i.e., the order in which the PSI methods are ranked are modified by the relevance feedback mechanism to be described in greater detail.

The relevance feedback mechanism, in one embodiment, consists of the user pressing a button that informs the application that a particular PSI method has provided helpful diagnostic information. It is important to note that the system of the invention may not have actually solved the problem, but importantly may have eliminated a number of other possibilities. The search query, which is the symptom string the user employed to locate the successful problem-solving method, is then attached to the original method. These additional words may skew this PSI method more towards this particular symptom string, thereby causing this method to appear higher in the list of appropriate methods on subsequent queries. Each of these PSI methods may contain one or more hyperlinks to other PSI methods or specific problems/solution records, thereby creating a network of methods and solutions. The PSI methods that are ranked and returned for a query typically in accordance with the invention will be found to improve over time due to the relevance feedback mechanism. The development, improvement, and reuse of the PSI Methods thereby will improve the diagnostic skills of the user and increase the accuracy and consistency of the provided diagnostic service.

From the foregoing it will be apparent that several significant features are provided in the invention. First, the invention emphasizes and teaches problem source identification skills rather than problem rediscovery. Secondly, as will become more readily apparent, the invention employs a semantic distance search algorithm to retrieve relevant methods as opposed to the case or rule based expert systems prevalent in the prior art. Thirdly, the user search query is employed to provide relevance feedback which improves the network over time as previously noted. Furthermore, by employing such semantic distance search technology, the need is eliminated for the expensive creation and maintenance of complicated cases or rules.

It will be readily apparent that the invention is not intended to be limited in any way to application only to software defect support. Rather, it readily admits to applicability in essentially any problem source identification environment wherein the problem domain knowledge base is either large, constantly changing, or insufficiently well understood enough to create a comprehensive or case-based system. It is a significant advantage that the invention does not attempt to solve the problem. In contrast, conventional expert systems in fact do attempt to go directly from symptom to solution. However the design of the invention assumes there is insufficient knowledge in the database to solve the problem. Accordingly, the invention is directed to situations wherein there are large, poorly understood problem domains which are constantly changing. It is a feature of the invention to address this problem by focusing on identifying the best problem source identification technique rather than solving the problem per se. By putting focus on problem source identification rather than rediscovery of the problem, the complex distributed heterogeneous world of computing may be simplified into well understood problem source identification techniques.

By using these PSI techniques, a "service" analyst (whether it be for software defect support, or medical diagnosis, etc.) can decrease the size of the problem domain much in the same way a computer uses a binary search algorithm. In addition, it is a feature of the invention to capitalize on the fact that there is a much smaller set of PSI techniques and that they would not change as much over time as rules or cases. Yet an additional although somewhat intangible but significant advantage to the teachings of the invention is that it implicitly provides additional training received by the service analyst. Rather than learning rediscovery skills which quickly become useless or obsolete as the product line rapidly changes, the service analyst employing the invention learns problem source identification skills which often transcend product and brand boundaries.

Expert systems continue to be a growing market, even though more and more companies have been discouraged by the disparity between the costs to develop an expert system and the return on investment. For many large companies, the rule or case-based systems have proven to be too costly to build and much too costly to maintain as well. The invention greatly simplifies the whole model and paradigm.

With the foregoing high level view of the invention having thus been provided, attention is now directed to FIG. 1, which shows a block diagram of a plurality of computers, workstations, or the like, which may be employed in a network such as that shown wherein the invention may be advantageously implemented.

Figure 3:
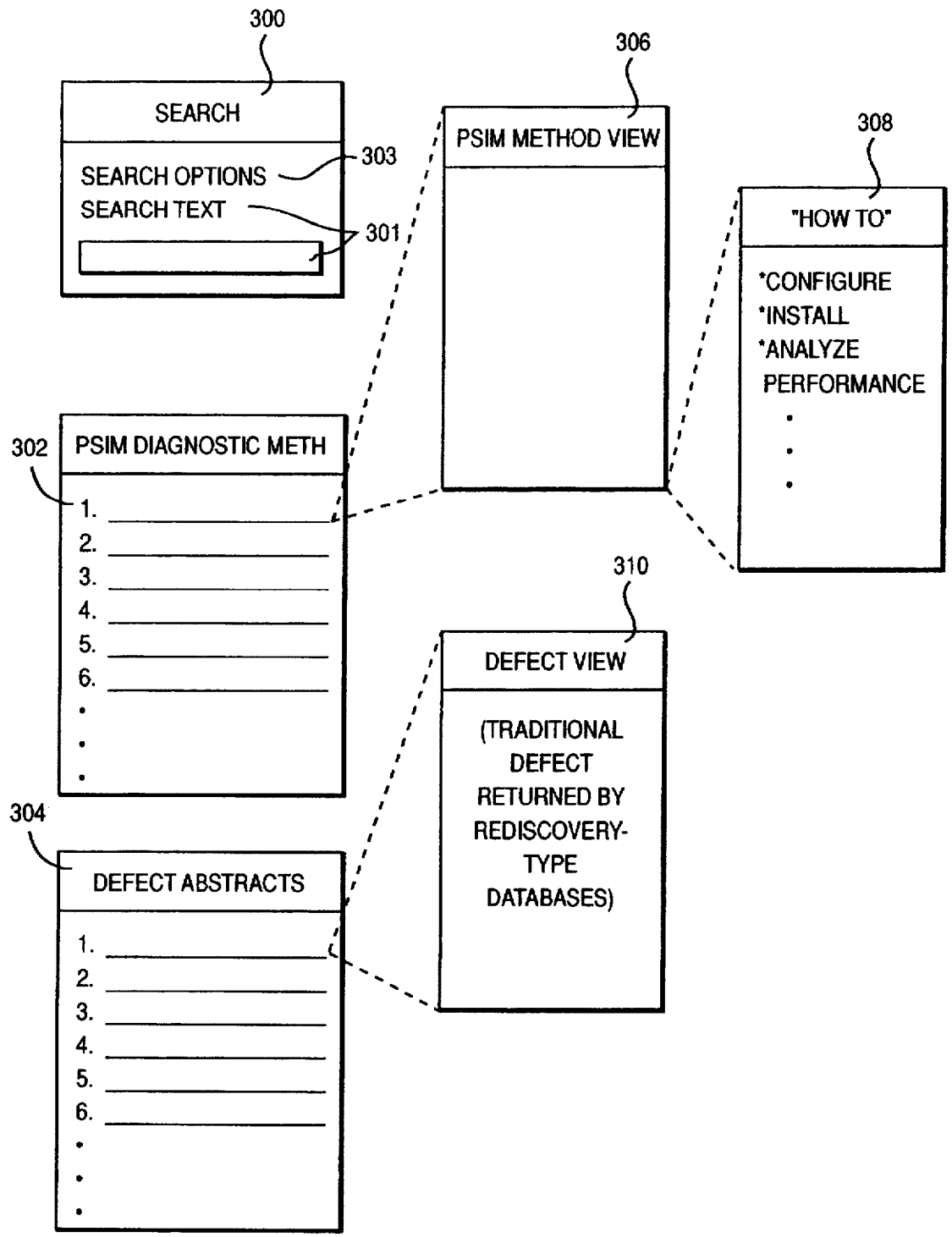
FIG. 3 is an illustration of a typical graphical user interface which may be provided to the end user for input/output.

Turning now to FIG. 3, there is depicted a representative collection of typical windows encountered in an implementation of the invention on a display screen of one of the computers of FIG. 1. In use, a user faced with a problem first formulates a search strategy and a search text argument 301 in the search window 300, articulating as best he or she can, what the problem is. The invention admits to many differing types of search options 303 for carrying this out well known in the art such as Boolean searches, specifying proximity of key words, and the like. The system then takes the argument 301 and runs it against a database with a statistical database search (both of which will be hereinafter described in greater detail), the result of which is a problem source identification (PSI) diagnostic method window 302, having as its contents various suggested diagnostic methods to be carried resulting from the clues given by the search argument 301. One example diagnostic method for addressing faults in a computer network might be, for example, requesting the user to ping the remote host (shown as diagnostic method #4 in diagnostic window 302. It will be noted that the series of diagnostic methods listed in window 302 have a hierarchical arrangement wherein the methods listed at the top of the list have a higher degree of probability of being successful (based upon user experience feedback) than those methods appearing lower in the list.

Still referring to FIG. 3, if the user desires, further more detailed information about a given method appearing in the diagnostic method window 302 may be found such as that shown in the PSI method view window 306. The text appearing in this window is a more detailed description of the corresponding PSI method appearing in the diagnostic method window 302 selected by the user. As will be described in greater detail hereinafter, the relevance feedback from the users of the system will provide a skew which causes the method #1 (corresponding to method view 306) to appear first on the diagnostic method window 302.

In a typical embodiment, the contents of the method view window 306 would consist of text on how to debug the symptom represented by the user search argument 301 from the search window 300. Additionally, however, it may also desirably further consist of "how to" types of information such as that shown in the "how to" window 308. This may be textual information describing to the user how to configure, install, or analyze performance of the system, subsystems, components, or the like.

Also shown in FIG. 3 is a defect abstract window 304. This may be recognized as a more conventional short descriptive list of defects which may also be located by the database search in response to the argument 301. For each such possible specific shortened description of defects, preferably a corresponding defect view 310 window will be provided, amplifying on each such defect.

Again, as with the diagnostic methods 302, preferably the database search engine and statistics will prioritize the listed defects such that ones appearing at the top of the list are more likely to be specific problem solutions to the problem set forth in the argument 301. The text in the defect view window 310 corresponding to a particular defect will be recognized as the traditional defect information returned by most prior art "rediscovery" types of problem-solving databases.

Figure 4:
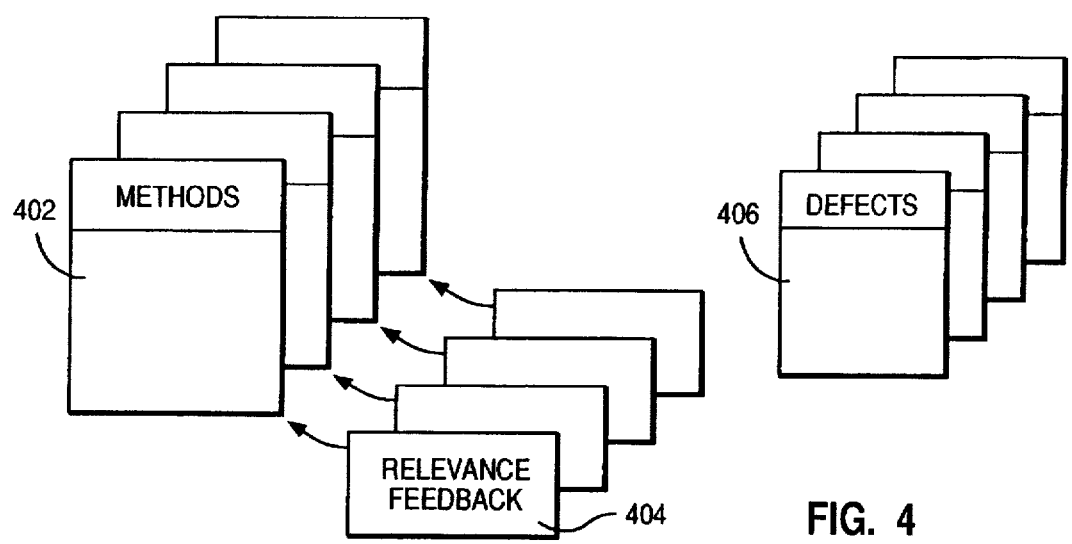
FIG. 4 is a conceptual illustration of the statistical database search in accordance with the invention illustrating the relevance feedback mechanism.

Turning now to FIG. 4, a conceptual high level illustration of the invention may be seen there. The invention provides for a statistical database comprised of problem solution methods 402 as well as the more conventional collection of defect information 406. An important aspect of FIG. 4, however, is the appearance of the relevance feedback mechanism 404 tied into the problem source identification methods 402 which will be described in greater detail later. Suffice is to say for the present that this relevance feedback 404 represents a history of user interaction with the system so as to provide a statistical basis for ranking the PSI methods which will appear in a diagnostic window 302. The database build details and results of the database build will be described hereinafter in greater detail.

Figure 5:
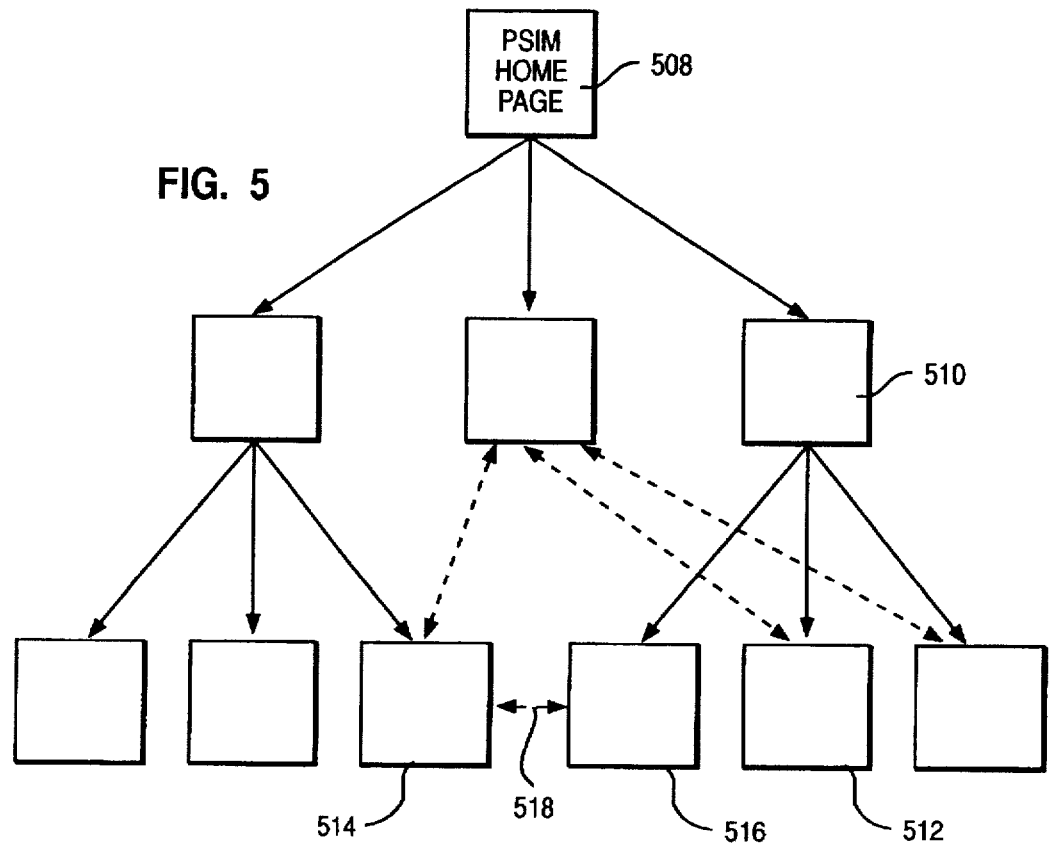
FIG. 5 is a pictorial representation of a hierarchical diagnostic network including hyperlinks employed in the implementation of the invention.

Referring now to FIG. 5, before going into greater detail regarding the relevance feedback aspect of the invention, it will first be noted that the invention admits to multiple methods for searching the diagnostic network such as that shown in FIG. 5. A statistical search into such a network of the diagnostic methods provides an easy mechanism to bypassing elementary diagnostic steps and attempting to immediately pinpoint critical steps. Providing for the diagnostics methods in a hierarchical diagnostic network such as that shown in FIG. 5 further allows for easy step by step development and browsing which provides the ability to create an elaborate network of documents with hyperlinks providing correlation between methods.

Whereas the relevance feedback mechanism to be described provides a dynamic method of creating and weighing new and current relationships between methods, yet another view of related PSI methods in the problem domain is sometimes useful as shown by the hierarchical network of FIG. 5 wherein hyperlinks provide a static method of viewing the related methods in the problem domain. In a practical implementation of such a system providing for hyperlinks, a PSI method homepage 508 may be provided with an elaborate network of documents 510–516 containing information about the related PSI methods. It is important to note that by providing hyperlinks such as link 518 between these documents, this static method of viewing such related methods may thereby be provided. Thus, in summary, two views of the related PSI methods may be provided for—a static method involving hyperlinks 518, and the relevance feedback method to be described now which provides a dynamic method of creating and weighting the new and current relationships.

Figure 6:
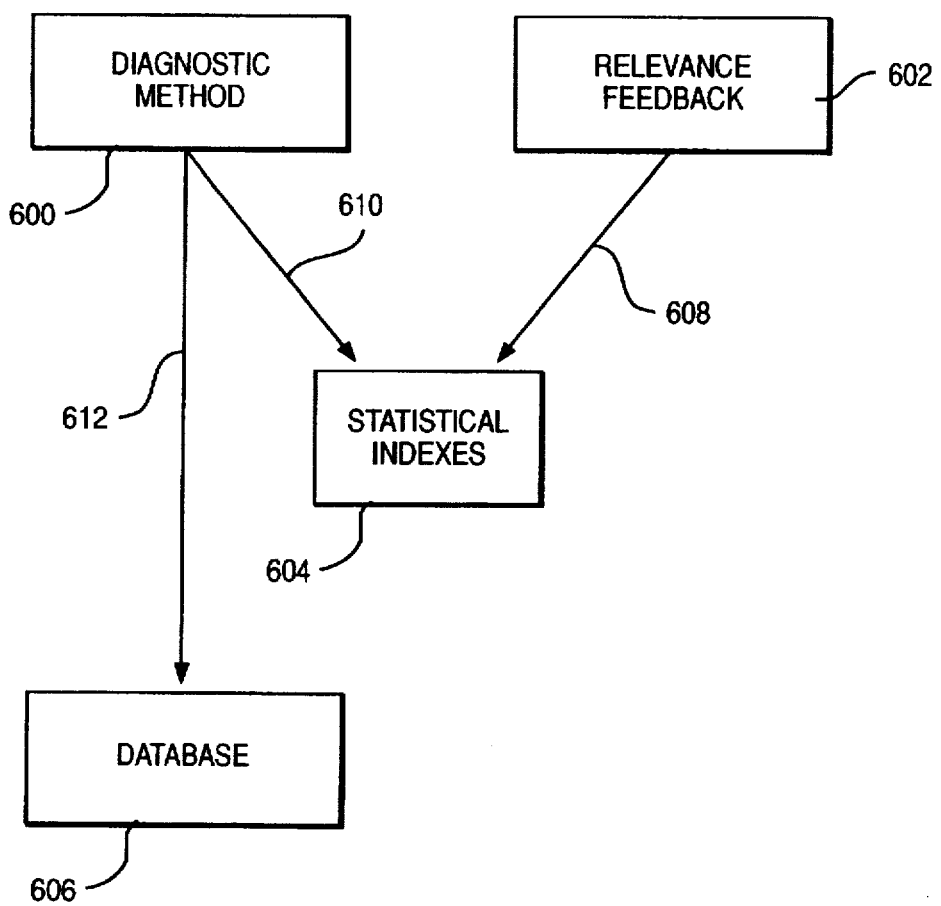
FIG. 6 is a pictorial representation of a database build with relevance feedback utilized in a preferred embodiment of the invention.

Turning now to FIG. 6, additional detail will be provided detailing how, in a preferred embodiment, relevance feedback may be effected by the system of the invention and how the database build may transpire with such relevance feedback. Shown in the figure is a conceptual block diagram representing various components of the system. More particularly, diagnostic method block 600 is intended to represent the various PSI methods collected in the system. Additionally, data gathered from the user on the relevance of such methods to solving the problems is shown conceptually by the relevance feedback block 602.

After the system is in use, statistical indexes 604 will be generated from the users in correlating the methods 600 by means of the relevance feedback 602. These indexes 604 will then be utilized in subsequent access to the database 606. For each such diagnostic method (listed as diagnostic methods 302 in FIG. 3) and shown collectively as diagnostic methods 600, the relevance feedback 602 will be combined with it to provide statistical analysis. However, only a pointer to the file system referenced to the diagnostic method(s) 600 will be provided in the database 606. It will be noted that the diagnostic methods 600 preferably will be pre-sorted into key types or corpuses (e.g., problem domains). It will further be appreciated that the relevance feedback file 602, in effect, skews statistical indexing 604, however, it is not placed into the database 606, i.e., is not generally available to the user.

Focusing more particularly on the relevance feedback function 602, it will be readily appreciated that there are many ways to provide such relevance feedback. One practical, effective implementation is to provide a user activated feedback button on the user interface of FIG. 3 which, in response to input from the user, communicates to the PSI method application that the particular diagnostic method 600 employed by the user was helpful. This, in turn, causes the application to append the search text (reference numeral 302, FIG. 3) to the relevance feedback 602 (FIG. 6) for that particular diagnostic method 600.

When the search database of FIG. 6 is rebuilt periodically, the relevant feedback file 602 will be appended to the diagnostic method file 600 for statistical analysis in order to arrive at the statistical indexes, 604. This causes the diagnostic method's statistical footprint to be skewed in the indexes 604 in favor of the relevance feedback 602.

As a result of this periodic database 606 build, a normal build of defects (406, FIG. 4) will of course transpire. However, it is significant that an additional build of diagnostic methods 600 further occurs which is weighted by the relevance feedback 604. Key types for corpuses may have been defined for discrete problem domains. It is important to note that after such database build, searches may now be performed on the database 606 per FIG. 3, which will return defect (304) and diagnostic (302) abstracts. The defect abstracts, 304 would normally point to objects which have been stored in the database 606. (As an aside, compression technology well known in the art may advantageously be employed to save disk space, as normally one would not desire to edit these objects directly.) The diagnostic method abstracts, 302, would normally point to objects or files which exist in a file system, making it easy to edit and browse directly from the file system. Example files include the PSI method view files 306 and the "how to" files 308.

At this point it may be helpful to provide an example of three cases of searching employing the relevance feedback steps of the invention wherein a user, as a result of the search, will have produced by the invention diagnostic methods 302 and defect abstracts 304 per FIG. 3.

In the first case, the diagnostic method abstract 302 may provide enough information for the technician to perform the method abstracted therein. If the method helps the technician or user, such individual will activate a user feedback button next to the particular abstract shown in window 302. The application will then append the search text 301 to the relevance feedback file 602 which gave rise to this successful search associated with the diagnostic method file 302 pointed to by the abstract 306.

In yet a second case, the diagnostic method abstract 302 may appear useful or interesting to the technician or user viewing the method 306. If the method helps, the technician or user would activate the feedback button on the viewer. The application will then append the search text 301 to the relevance file 602 associated with the diagnostic method file 306 being currently viewed.

In case 3, the diagnostic method abstract 302 again may appear interesting to the technician or user who is viewing the method 306. The method preferably will contain a hyperlink to another method. This third method will assist the technician or user, such that he or she will then activate an appropriate button on the viewer of the user interface. The application will then append the search text 301 to the relevance feedback file 602 associated with the diagnostic method file being viewed.

Figure 7:
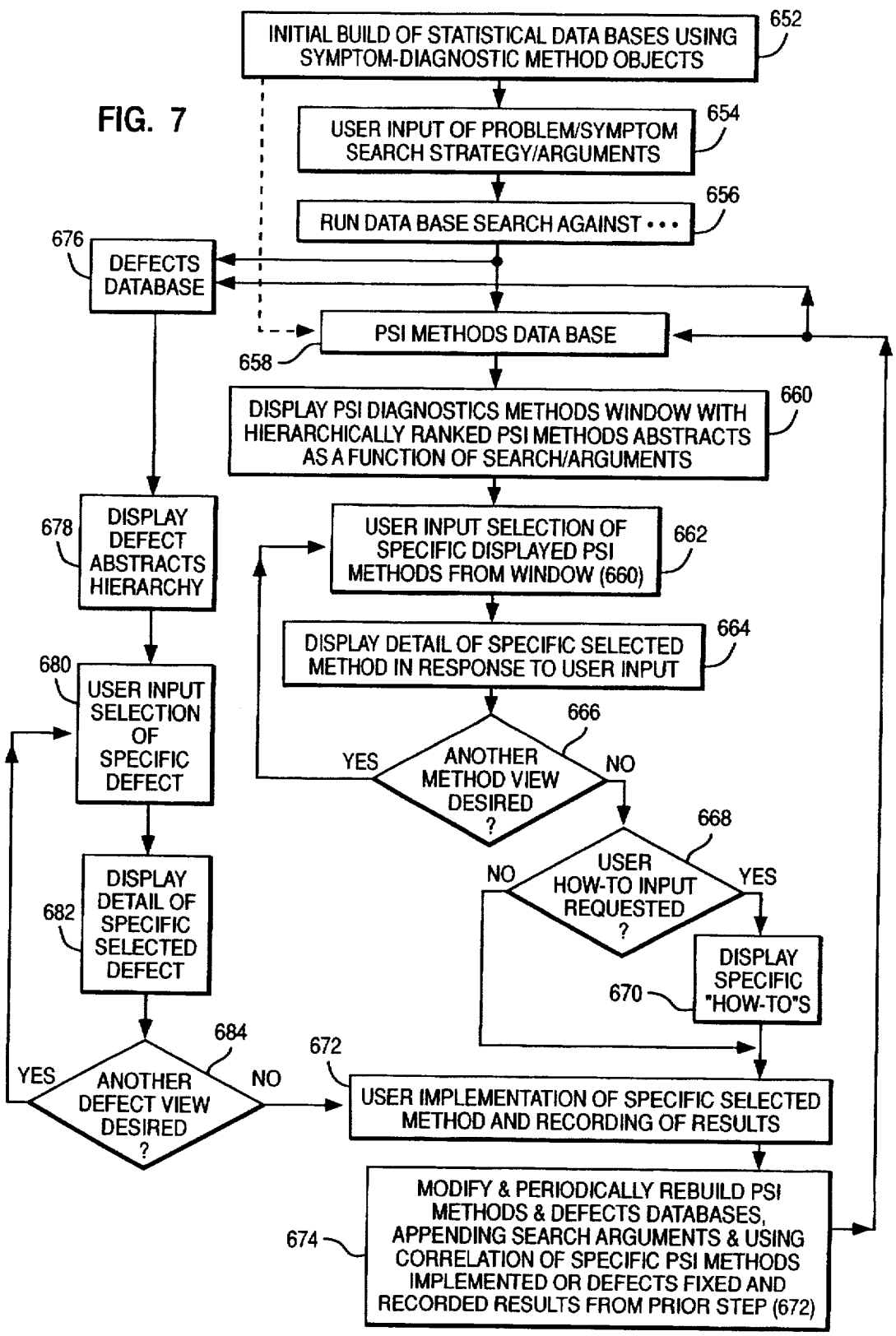
FIG. 7 is a flow diagram illustrating the flow of a software system in accordance with the invention implementable on the system of FIG. 1 for effecting problem source identification.

Turning now to FIG. 7, a flow diagram is illustrated therein which may be implemented in program code and executed on the system of FIG. 1 for effecting the invention. First, after obtaining information about the problem domain, an initial build is made of statistical databases using symptom-diagnostic method objects, 652. Once this has been done, the system may begin to be used whereby through continued such use and the relevance feedback feature, the system improves over time.

In use, user input is received, 654, of a problem or symptom in the problem domain as well as search strategy and arguments. Database searches are then run, 656, against the previously built PSI methods and defects databases, 658, 676, respectively. As a result of such searches, a PSI diagnostics methods window (302 of FIG. 3) is displayed with hierarchically PSI methods abstracts as a function of the search/arguments, shown at step 660. The user will then interact with this graphical user interface display, providing user input selection of specific displayed PSI methods as desired to be selected from the window generated in step 660—this step being shown at block 662. In response to such user input, display will be effected of the details of a specific selected method, 664, such as the specific PSI method view window 306 of FIG. 3, which includes details of the selected method to be attempted in order to diagnose the problem. The system then queries from the user whether another method view such as that of 306 of FIG. 3 is desired, in which case the system loops back to block 662 for the user to select another perhaps more appropriate PSI method for viewing. Once all such desired methods have been viewed, 666, the system queries at block 668 as to whether the user desires more specific "how to" input (such as that shown in the window 308 of FIG. 3). If user response indicates this is desired, the specific "how to's" details regarding configuration, installation, etc., will be shown.

In response to these displayed methods and how to information, the user is then expected to implement specifically selected methods of diagnosis and will record the relative success of such methods, 672. A key feature of the invention it will be recalled is relevance feedback wherein the databases are improved as a result of this user action. Thus, as shown at block 674, the PSI methods and defects databases will then be modified and periodically rebuilt as a function of this user-recorded result information. Search arguments will be appended using correlation of the specific PSI methods implemented or defects fixed and recorded results generated from the prior step 672. The arrows exiting block 674 to the PSI methods database and defects database 658, 676, respectively, are intended to reflect this modification and rebuilding of the databases.

It will be recalled that notwithstanding the foregoing system and method description, a user may nevertheless also more conventionally desire display of defects and abstracts. Accordingly, in response to the user input at block 654 and the resulting execution of the database search against the defects database in response to the user-input search strategy and arguments, a display defect abstracts hierarchy 678 will preferably also be shown (such as that shown in window 304 of FIG. 3). In similar manner to the display of the PSI diagnostic methods in response to the database search, user input is then solicited through the user interface for selection of specific defect views as desired, 680. This, in turn, will result in display of details of specific selected defects, such as that shown in the defect window 310 of FIG. 3. The system will query whether another defect view is desired, 684, in which case, if the response is affirmative, the system loops back to block 680 to solicit user input selection of another specific defect. If no further defect views are desired, the system exits to block 672 whereupon the user may again attempt implementation of defect correction as a result of viewing the defect abstracts and views. The user will then record the results, as shown in block 672, and the process continues wherein the PSI methods and defects databases will be further improved as a result of recording of these results from viewing defects.

While the invention has been shown and described with reference to particular embodiments thereof, it will be understood by those skilled in the art that the foregoing and other changes in form and detail may be made therein without departing from the spirit and scope of the invention.

I claim:

1. A method for providing support for problem resolution in a computer system, comprising:
   building a problem solution identification (PSI) database of diagnostic methods;
   receiving a user-defined definition of said problem associated with said computer system;
   searching said database with a semantic distance search in response to said received definition;
   generating a plurality of hierarchically-ranked diagnostic methods identifying prospective sources of said problem in response to said searching;
   executing one of said diagnostic methods;
   recording the result of said executing one of said diagnostic methods comprising the steps of
      compiling a relevance feedback file having search texts appended thereto corresponding to different ones of said methods;
      periodically appending said relevance feedback file to said database;
      statistically analyzing said appended relevance feedback file to generate statistical indexes for weighting said methods;
   altering said database with relevance feedback from said user as a function of said recording; and wherein said searching is performed with said statistical indexes.

2. The method of claim 1 wherein said user-defined problem definition comprises at least one search argument.

3. The method of claim 2 further including
   displaying user-selectable abstracts of said hierarchically ranked diagnostic methods in a graphic user interface window of said computer system.

4. The method of claim 3 further including
   detecting user input from said window designating one of said abstracts; and
   displaying in response to said detecting a problem source identification method view corresponding to said designated one of said abstracts.

5. The method of claim 4 wherein said abstracts are displayed in an order corresponding to said hierarchical ranking of said diagnostic methods.

6. The method of claim 5 wherein each of said abstracts has a different said problem source identification method view associated therewith, each said view including descriptive text; and
   wherein said order of said abstracts in said window is a function of said relevance feedback.

7. The method of claim 6 wherein said order of said abstracts in said window is further a function of said text.

8. The method of claim 7 further including
   building a defect database; and
   generating a plurality of hierarchically ranked defect abstracts in response to said searching.

9. The method of claim 8 further including
   altering said defect database with said relevance feedback from said user as a function of said recording.

10. An apparatus for providing support for problem resolution in a computer system, comprising:
    means for building a problem solution identification (PSI) database of diagnostic methods;
    means for receiving a user-defined definition of said problem associated with said computer system;
    means for searching said database with a semantic distance search in response to said received definition;
    means for generating a plurality of hierarchically-ranked diagnostic methods identifying prospective sources of said problem in response to said searching;
    means for executing one of said diagnostic methods;
    means for recording the result of said executing one of said diagnostic methods including means for compiling a relevance feedback file having search texts appended thereto corresponding to different ones of said methods;

means for periodically appending said relevance feedback file to said method database;

means for statistically analyzing said appended relevance feedback file to generate statistical indexes for weighting said methods;

means for altering said database with relevance feedback from said user as a function of said recording.

11. The apparatus of claim 10 wherein said user-defined problem definition comprises at least one search argument.

12. The apparatus of claim 11 further including means for displaying user-selectable abstracts of said hierarchically ranked diagnostic methods in a graphic user interface window of said computer system.

13. The apparatus of claim 12 further including means for detecting user input from said window designating one of said abstracts; and means for displaying in response to said detecting a problem source identification method view corresponding to said designated one of said abstracts.

14. The apparatus of claim 13 wherein said abstracts are displayed in an order corresponding to said hierarchical ranking of said diagnostic methods.

15. The apparatus of claim 14 wherein each of said abstracts has a different said problem source identification method view associated therewith, each said view including descriptive text; and wherein said order of said abstracts in said window is a function of said relevance feedback.

16. The apparatus of claim 15 wherein said order of said abstracts in said window is further a function of said text.

17. The apparatus of claim 16 further including means for building a defect database; and means for generating a plurality of hierarchically ranked defect abstracts in response to said searching.

18. The apparatus of claim 17 further including means for altering said defect database with said relevance feedback from said user as a function of said recording.

19. A computer program product for providing support for problem resolution in a computer system, comprising:

a computer usable medium having computer readable program code means embodied in said medium, said program code means comprising:

computer readable program code means for building a problem solution identification (PSI) database of diagnostic methods;

computer readable program code means for receiving a user-defined definition of said problem associated with said computer system;

computer readable program code means for searching said database with a semantic distance search in response to said received definition;

computer readable program code means for generating a plurality of hierarchically-ranked diagnostic methods identifying prospective sources of said problem in response to said searching;

computer readable program code means for executing one of said diagnostic methods;

computer readable program code means for recording the result of said executing one of said diagnostic methods including computer readable program code means for compiling a relevance feedback file having search texts appended thereto corresponding to different ones of said methods;

computer readable program code means for periodically appending said relevance feedback file to said method database;

computer readable program code means for statistically analyzing said appended relevance feedback file to generate statistical indexes for weighting said methods;

computer readable program code means for altering said database with relevance feedback from said user as a function of said recording.

20. The computer program product of claim 19 wherein said user-defined problem definition comprises at least one search argument.

21. The computer program product of claim 20 further including computer readable program code means for displaying user-selectable abstracts of said hierarchically ranked diagnostic methods in a graphic user interface window of said computer system.

22. The computer program product of claim 21 further including computer readable program code means for detecting user input from said window designating one of said abstracts; and computer readable program code means for displaying in response to said detecting a problem source identification method view corresponding to said designated one of said abstracts.

23. The computer program product of claim 22 wherein said abstracts are displayed in an order corresponding to said hierarchical ranking of said diagnostic methods.

24. The computer program product of claim 23 wherein each of said abstracts has a different said problem source identification method view associated therewith, each said view including descriptive text; and wherein said order of said abstracts in said window is a function of said relevance feedback.

25. The computer program product of claim 24 wherein said order of said abstracts in said window is further a function of said text.

26. The computer program product of claim 25 further including computer readable program code means for building a defect database; and computer readable program code means for generating a plurality of hierarchically ranked defect abstracts in response to said searching.

27. The computer program product of claim 26 further including computer readable program code means for altering said defect database with said relevance feedback from said user as a function of said recording.

* * * * *